United States Patent
Memory (10) Patent No.: US 7,789,103 B2
(45) Date of Patent: Sep. 7, 2010

(54) DENSE PHASE INDUCTION SYSTEM AND METHOD

(75) Inventor: Russell James Memory, Saskatoon (CA)

(73) Assignee: CNH Canada, Ltd. (CA)

(*) Notice: Subject to any disclaimer, the term of this patent is extended or adjusted under 35 U.S.C. 154(b) by 0 days.

(21) Appl. No.: 12/271,816

(22) Filed: Nov. 14, 2008

(65) Prior Publication Data

US 2010/0122647 A1    May 20, 2010

(51) Int. Cl.
- F16K 15/00    (2006.01)
- F16K 17/00    (2006.01)
- F16K 21/04    (2006.01)

(52) U.S. Cl. .................................. 137/515.5

(58) Field of Classification Search .......... 137/1, 137/2, 515.5, 533.25, 533.29, 515.7; 111/200, 111/900, 915, 170, 174, 175
See application file for complete search history.

(56) References Cited

U.S. PATENT DOCUMENTS

| | | | |
|---|---|---|---|
| 524,474 A | 8/1894 | Wade |
| 670,534 A | 3/1901 | Carmical |
| 1,369,649 A | 2/1921 | Gieseler |
| 2,062,295 A | 12/1936 | Cary et al. |
| 2,171,205 A | 8/1939 | Zinke |
| 2,193,738 A | 3/1940 | Perrin |
| 2,559,183 A | 7/1951 | Barnett |
| 2,671,690 A | 3/1954 | Von Ehrenkrook |
| 2,814,531 A | 11/1957 | Murray, Jr. |
| 2,937,049 A | 5/1960 | Osawa |
| 3,197,261 A | 7/1965 | Kauffman |
| 3,207,560 A | 9/1965 | Brown |
| 3,376,897 A | 4/1968 | Dolder et al. |
| 3,386,474 A | 6/1968 | Kimmel |
| 3,387,895 A | 6/1968 | Hochmuth et al. |
| 3,515,315 A | 6/1970 | Kidd |
| 3,543,704 A | 12/1970 | Hansen |
| 3,548,765 A | 12/1970 | Grataloup |
| 4,036,408 A | 7/1977 | Dugge |
| 4,082,364 A | 4/1978 | Krambrock |
| 4,200,412 A | 4/1980 | Steele |
| 4,244,522 A | 1/1981 | Hartwig |
| 4,264,243 A | 4/1981 | Bentzen-Bilkvist |
| 4,280,419 A | 7/1981 | Fischer |
| 4,379,664 A | 4/1983 | Klein et al. |
| 4,413,935 A | 11/1983 | Smith et al. |
| 4,506,704 A | 3/1985 | Boom et al. |
| 4,553,882 A | 11/1985 | Knappertz |
| 4,562,779 A | 1/1986 | Briggs |
| 4,674,922 A | 6/1987 | Federhen et al. |
| 4,738,770 A | 4/1988 | Hastings et al. |
| 4,779,765 A | 10/1988 | Neumeyer |
| 4,793,743 A | 12/1988 | Grodecki et al. |

(Continued)

FOREIGN PATENT DOCUMENTS

BR    9501580-9 A    11/1995

(Continued)

*Primary Examiner*—Christopher J. Novosad
(74) *Attorney, Agent, or Firm*—Rebecca Henkel (57) ABSTRACT

A dense phase induction system and method includes an induction valve assembly configured and oriented to establish and maintain efficient transfer and induction of granular material. The induction valve assembly includes arcuate geometry to facilitate the flow of granular material from a granular supply to a dense phase distribution system.

9 Claims, 6 Drawing Sheets

U.S. PATENT DOCUMENTS

| | | | |
|---|---|---|---|
| 4,843,983 A | 7/1989 | Olson | |
| 4,872,785 A | 10/1989 | Schrage et al. | |
| 5,033,914 A | 7/1991 | Wuertele et al. | |
| 5,069,583 A | 12/1991 | Caldwell | |
| 5,117,861 A * | 6/1992 | McConnell et al. | 137/515.7 |
| 5,156,102 A | 10/1992 | Andersen | |
| 5,161,473 A | 11/1992 | Landphair et al. | |
| 5,240,355 A | 8/1993 | Hudalla | |
| 5,379,706 A | 1/1995 | Gage et al. | |
| 5,392,722 A | 2/1995 | Snipes et al. | |
| 5,407,305 A | 4/1995 | Wallace | |
| 5,494,381 A | 2/1996 | Heyl et al. | |
| 5,575,225 A | 11/1996 | Smith et al. | |
| 5,749,682 A | 5/1998 | Epting | |
| 5,813,801 A | 9/1998 | Newbolt et al. | |
| 5,878,679 A | 3/1999 | Gregor et al. | |
| 5,927,217 A | 7/1999 | Halford et al. | |
| 6,047,652 A | 4/2000 | Prairie et al. | |
| 6,253,693 B1 | 7/2001 | Mayerle et al. | |
| 6,298,797 B1 | 10/2001 | Mayerle et al. | |
| 6,308,645 B1 | 10/2001 | Newkirk et al. | |
| 6,308,646 B1 | 10/2001 | Luxon | |
| 6,311,727 B1 | 11/2001 | Campau | |
| 6,343,896 B1 | 2/2002 | Goodier et al. | |
| 6,499,413 B2 | 12/2002 | Kleinknecht et al. | |
| 6,505,569 B1 | 1/2003 | Richard | |
| 6,581,532 B1 | 6/2003 | Hagen et al. | |
| 6,584,919 B2 | 7/2003 | McQuinn | |
| 6,644,225 B2 | 11/2003 | Keaton | |
| 6,648,558 B1 | 11/2003 | Shultz | |
| 6,742,464 B1 | 6/2004 | Chiu | |
| 6,782,835 B2 | 8/2004 | Lee et al. | |
| 6,854,405 B2 | 2/2005 | Memory | |
| 6,899,042 B1 | 5/2005 | Kowalchuk | |
| 6,904,851 B2 | 6/2005 | Memory | |
| 6,928,938 B2 | 8/2005 | Memory | |
| 6,928,939 B1 | 8/2005 | Johnson et al. | |
| 6,935,254 B2 | 8/2005 | Ostrander et al. | |
| 7,017,502 B2 | 3/2006 | Quam et al. | |
| 7,040,242 B2 | 5/2006 | Memory | |
| 7,048,475 B2 | 5/2006 | Cloue et al. | |
| 7,101,120 B2 | 9/2006 | Jurkovich | |
| 7,213,525 B2 | 5/2007 | Meyer et al. | |
| 7,267,061 B2 | 9/2007 | Mayerle | |
| 7,270,064 B2 | 9/2007 | Kjelsson et al. | |
| 2006/0243179 A1 | 11/2006 | Landphair et al. | |
| 2007/0022928 A1 | 2/2007 | Kowalchuk | |
| 2007/0181048 A1 | 8/2007 | Pleyer | |

FOREIGN PATENT DOCUMENTS

| | | |
|---|---|---|
| DE | 3528301 A1 | 2/1987 |
| DE | 19620016 A1 | 11/1997 |
| DE | 10006811 A1 | 1/2001 |
| EP | 0331302 A1 | 6/1989 |
| GB | 2064021 A | 6/1981 |
| GB | 2096085 A | 10/1982 |
| GB | 2222131 A | 2/1990 |
| JP | 61111227 A | 5/1986 |
| JP | 01013311 A | 1/1989 |
| JP | 06092454 A | 4/1994 |
| JP | 2003070329 A | 3/2003 |
| JP | 2003081425 A | 3/2003 |

* cited by examiner

FIG. 6

DENSE PHASE INDUCTION SYSTEM AND METHOD

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

The present invention relates generally to the dense phase distribution of granular material, and more particularly, to a dense phase induction system and method including an induction valve assembly configured and oriented to establish and maintain efficient transfer and induction of granular material.

BACKGROUND OF THE INVENTION

Many agricultural processes require the delivery of a granular material, such as seed, fertilizer, and the like, from a bulk storage tank toward an outlet or secondary containment system. The granular material is often motivated pneumatically through a series of lines. The flow of granular material through the lines is typically classified as one of two general types; specifically, the granular material may be motivated in a dilute phase flow or in a dense phase flow. During dilute phase flow, the volume percentage of air in the line is much greater relative to the volume percentage of granular material. Alternatively, during dense phase flow the relative ratio is reversed; meaning that a greater volume percentage of granular material is motivated through the line by a lower volume percentage of air.

In certain dense phase flow applications, the bulk storage tank(s) are pressurized relative to the ambient environment to provide a motivating force to urge the granular material from the bulk storage tank through the lines. In an alternative dense phase flow application, an induction system is used to transfer the granular material from the bulk storage tank and into the pressurized dense phase delivery system. For example, the bulk storage tank is generally maintained at approximately atmospheric pressure. The granular material is mechanically extracted from the bulk storage tank into a primary containment tank. The primary containment tank is pressurized relative to the ambient environment to again provide a motivating force to urge the granular material through the lines.

Use of an induction system for dense phase flow presents three main considerations and challenges. First, in the agricultural context, any induction system (i.e., a system used to transfer the granular material from ambient or lower pressure to line or higher pressure for use by a dense phase distribution system) must be efficient because an agricultural vehicle/implement has inherent power supply limitations, be it hydraulic, pneumatic, electric, and the like. Second, most granular material is susceptible to damage caused by the transfer process. For example, the granular material (e.g., seed) may be damaged by excessive pressure, control valving, and the like as it is urged through the overall system. Third, efficient dense phase flow is aided by ensuring a continual supply of granular material. This requires that the induction system constantly supply the granular material into the dense phase distribution system at the required pressure.

In view of at least the preceding considerations, dense phase flow presents significant challenges for any dense phase induction system. Therefore, a need exists for a dense phase induction system and method that incorporates an efficient, compact, and delicate induction valve assembly tailored to effectively overcome the established challenges.

SUMMARY OF THE INVENTION

The present invention overcomes the aforementioned drawbacks by providing a dense phase induction system and method that includes an induction valve assembly that is arranged and configured to effectively transport a granular material.

In accordance with one aspect of the invention, a dense phase induction system for inducting a granular material from a granular supply to a dense phase distribution system relative to a horizontal plane oriented substantially normal to the force of gravity, comprises an induction chamber downstream of the granular supply. The induction chamber has an induction chamber inlet in selective fluid communication with the granular supply and an induction chamber outlet downstream of the induction chamber inlet. An intermediate chamber is downstream of the induction chamber and has an intermediate chamber inlet in selective fluid communication with the induction chamber outlet and an intermediate chamber outlet downstream of the intermediate chamber inlet. A distribution chamber is downstream of the intermediate chamber and has a distribution chamber inlet in selective fluid communication with the intermediate chamber outlet and a distribution chamber outlet downstream of the distribution chamber inlet and in selective fluid communication with the dense phase distribution system. A first induction valve assembly is positioned between the induction chamber and the intermediate chamber. The first induction valve assembly includes an arcuate first valve seat that tapers radially inward from a first valve seat upstream end toward a first valve seat downstream end along a first valve seat surface, and an arcuate first plunger that tapers radially inward from a first plunger downstream end toward a first plunger upstream end along a first plunger surface. The arcuate first plunger is moveable between a first sealing position at which the arcuate first plunger is in sealing contact with the arcuate first valve seat and a first transfer position at which the arcuate first plunger is spaced apart from the arcuate first valve seat. A second induction valve assembly is positioned between intermediate chamber and the distribution chamber. The second induction valve assembly includes an arcuate second valve seat that tapers radially inward from a second valve seat upstream end toward a second valve seat downstream end along a second valve seat surface, and an arcuate second plunger that tapers radially inward from a second plunger downstream end toward a second plunger upstream end along a second plunger surface. The arcuate second plunger is moveable between a second sealing position at which the arcuate second plunger is in sealing contact with the arcuate second valve seat and a second transfer position at which the arcuate second plunger is spaced apart from the arcuate second valve seat.

The dense phase induction system may include a first valve seat angle defined between the first valve seat surface and the horizontal plane, and a first plunger upstream angle defined between the first plunger surface and the horizontal plane. A second valve seat angle may be defined between the second valve seat surface and the horizontal plane, and a second plunger upstream angle may be defined between the second plunger surface and the horizontal plane. At least one of the first valve seat angle, the first plunger upstream angle, the second valve seat angle, and the second plunger upstream angle may be substantially equal to or greater than an angle of repose defined by the granular material.

The dense phase induction system may further comprise a first plunger downstream angle defined between the first plunger surface and the horizontal plane and a second plunger downstream angle defined between the second plunger surface and the horizontal plane, wherein at least one of the first plunger downstream angle and the second plunger downstream angle are substantially equal to or greater than the angle of repose defined by the granular material.

At least one of the arcuate first valve seat, the arcuate first plunger, the arcuate second valve seat, and the arcuate second plunger may be substantially conical.

The distribution chamber may further comprise an arcuate bottom that tapers radially inward from an upstream bottom end toward a downstream bottom end along a bottom surface and a bottom surface angle defined between the bottom surface and the horizontal plane, wherein the bottom surface angle is substantially equal to or greater than an angle of repose defined by the granular material.

The dense phase induction system may include a first actuator assembly operatively coupled to the arcuate first plunger to move the arcuate first plunger between the first sealing position and the first transfer position and a second actuator assembly operatively coupled to the arcuate second plunger to move the arcuate second plunger between the second sealing position and the second transfer position.

The first actuator assembly may comprise a first actuator operatively coupled to the arcuate first plunger and a first support bracket extending from one of the arcuate first valve seat and the induction chamber to support the first actuator, and the second actuator assembly may comprise a second actuator operatively coupled to the arcuate second plunger and a second support bracket extending from one of the arcuate second valve seat and the intermediate chamber to support the second actuator.

The first actuator and/or the second actuator may be configured to bias at least one of the arcuate first plunger and the arcuate second plunger respectively toward the first sealing position and the second sealing position.

The intermediate chamber may include an intermediate port configured to receive a fluid into the intermediate chamber or exhaust the fluid from the intermediate chamber, and the distribution chamber may include a distribution port configured to receive a fluid into the distribution chamber.

In accordance with another aspect of the invention, a dense phase induction valve assembly for controlling the flow of a granular material from an upstream chamber to a downstream chamber relative to a horizontal plane oriented substantially normal to the force of gravity comprises an arcuate valve seat that tapers radially inward from a valve seat upstream end toward a valve seat downstream end along a valve seat surface and an arcuate plunger that tapers radially inward from a plunger downstream end toward a plunger upstream end along a plunger surface. The arcuate plunger is moveable between a sealing position at which the arcuate plunger is in sealing contact with the arcuate valve seat and a transfer position at which the arcuate plunger is spaced apart from the arcuate valve seat.

The dense phase induction valve assembly may further comprise a valve seat angle defined between the valve seat surface and the horizontal plane, wherein the valve seat angle is substantially equal to or greater than an angle of repose defined by the granular material.

At least one of the arcuate valve seat and the arcuate plunger may be substantially conical.

The dense phase induction valve assembly may further comprise a plunger angle defined between the plunger surface and the horizontal plane, wherein the plunger angle is substantially equal to or greater than an angle of repose defined by the granular material.

The plunger surface may include a plunger upstream surface having plunger upstream angle and a plunger downstream surface having a plunger downstream angle, wherein the plunger downstream angle is greater than the plunger upstream angle. The plunger upstream angle may be substantially equal to or greater than thirty-two degrees and the plunger downstream angle may be substantially equal to or greater than forty-five degrees.

The dense phase induction valve assembly may further comprise an actuator assembly operatively coupled to the arcuate plunger to move the arcuate plunger between the sealing position and the transfer position.

The actuator assembly may comprise an actuator operatively coupled to the arcuate plunger and a support bracket extending from one of the arcuate valve seat and the upstream chamber to support the actuator.

The arcuate valve seat may further comprise an engagement surface proximate the valve seat downstream end configured to engage the arcuate plunger and a flexible member coupled to the engagement surface that engages the arcuate plunger when the arcuate plunger is in the sealing position.

The engagement surface may be oriented at least partially downstream.

In accordance with still another aspect of the invention, a method of dense phase induction of a granular material from a granular supply to a dense phase distribution system comprises the following steps of: Providing an induction chamber downstream of the granular supply having an induction chamber inlet in selective fluid communication with the granular supply and an induction chamber outlet downstream of the induction chamber inlet. Providing an intermediate chamber downstream of the induction chamber having an intermediate chamber inlet in selective fluid communication with the induction chamber outlet and an intermediate chamber outlet downstream of the intermediate chamber inlet. Providing a distribution chamber downstream of the intermediate chamber having a distribution chamber inlet in selective fluid communication with the intermediate chamber outlet and a distribution chamber outlet downstream of the distribution chamber inlet and in selective fluid communication with the dense phase distribution system. Providing a first induction valve assembly positioned between the induction chamber and the intermediate chamber, the first induction valve assembly including an arcuate first valve seat that tapers radially inward from a first valve seat upstream end toward a first valve seat downstream end along a first valve seat surface and an arcuate first plunger that tapers radially inward from a first plunger downstream end toward a first plunger upstream end along a first plunger surface, wherein the arcuate first plunger is moveable between a first sealing position at which the arcuate first plunger is in sealing contact with the arcuate first valve seat and a first transfer position at which the arcuate first plunger is spaced apart from the arcuate first valve seat. Providing a second induction valve assembly positioned between intermediate chamber and the distribution chamber, the second induction valve assembly including an arcuate second valve seat that tapers radially inward from a second valve seat upstream end toward a second valve seat downstream end along a second valve seat surface and an arcuate second plunger that tapers radially inward from a second plunger downstream end toward a second plunger upstream end along a second plunger surface, wherein the arcuate second plunger is moveable between a second sealing position at which the arcuate second plunger is in sealing contact with the arcuate second valve seat and a second transfer position at which the arcuate second plunger is spaced apart from the arcuate second valve seat. Moving the arcuate first plunger to the first sealing position. Moving the arcuate second plunger to the second sealing position. Directing an amount of the granular material into the induction chamber. Moving the arcuate first plunger to the first transfer position to allow the amount of granular material into the intermediate chamber. Moving the arcuate first plunger to the first sealing position to seal the intermediate chamber. Pressuring the intermediate chamber to a first pressure. Pressuring the distribution chamber to a second pressure substantially equal to the first pressure. Moving the arcuate second plunger to the transfer position to allow the amount of granular material into the distribution chamber. De-depressurizing the intermediate chamber to substantially an ambient pressure. And, directing the amount of granular material through the distribution chamber outlet to enter the dense phase distribution system.

The foregoing and other aspects of the invention will appear in the detailed description that follows. In the description, reference is made to the accompanying drawings, which illustrate preferred example embodiments of the invention.

DETAILED DESCRIPTION OF THE EXAMPLE EMBODIMENTS

The following applications, each having a filing date of Nov. 14, 2008, are hereby incorporated by reference as if fully set forth herein: U.S. application Ser. No. 12/271,618 ("Sectional Distribution of Granular Product"); U.S. application Ser. No. 12/271,679 ("Agricultural Implement with Dense Phase Product Flow from a Primary Container"); U.S. application Ser. No. 12/271,723 ("Device and Method for Dense Phase Transport of Seed"); U.S. application Ser. No. 12/271,745 ("Agricultural Implement with Dense Phase Product Dispensing and Purging"); U.S. application Ser. No. 12/271,765 ("Valve and Method for Dense Phase Flow Control"); U.S. Pat. No. 7,640,877 ("Dense Phase Distribution Branch"); U.S. application Ser. No. 12/271,808 ("Pressure Supply Assembly for an Agricultural Implement with Dense Phase Product Flow"); and U.S. application Ser. No. 12/271,822 ("Granular Containment Assembly and Method").

Figure 1:
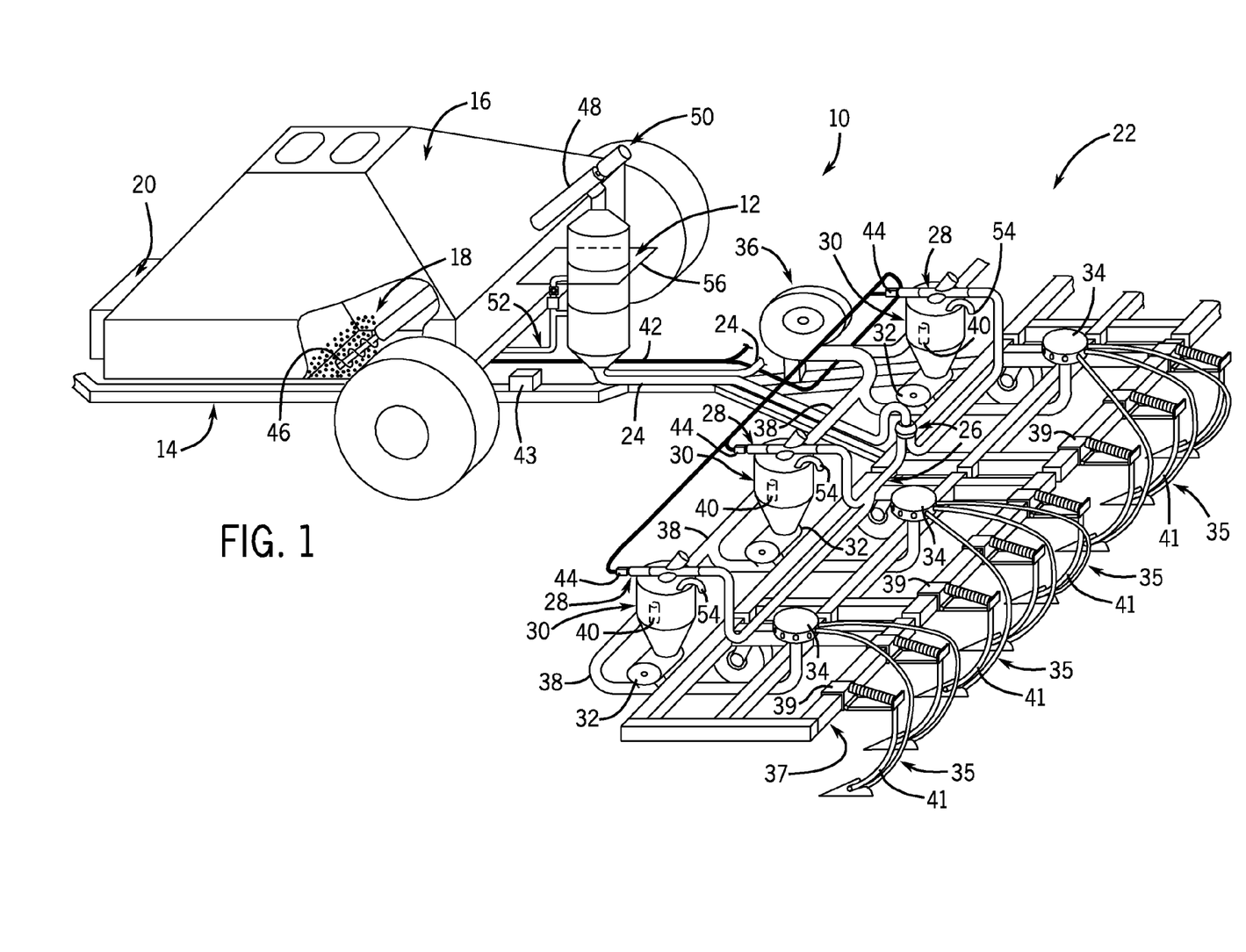
FIG. 1 is a partial perspective view of a dense phase air seeder incorporating an aspect of the invention.

A partial perspective view of an agricultural implement 10 incorporating a dense phase induction system 12 in accordance with an aspect of the invention is shown generally in FIG. 1. The dense phase induction system 12 is described in the context of the agricultural industry and the distribution of granular material, such as seed, fertilizer, and the like; however, the description is not intended to be limiting. As a result, the dense phase induction system 12 disclosed and claimed may be implemented in a variety of industries and contexts to distribute a range of granular materials.

Returning to the agricultural context, and with continued reference to FIG. 1, a wheeled frame 14 coupleable to a vehicle, such as a tractor (not shown), supports a granular supply tank 16. The granular supply tank 16 contains a granular material 18 (e.g., seed, fertilizer, and the like) at approximately atmospheric pressure. A compressor 20 is also secured to the wheeled frame 14 to supply a controllable pneumatic pressure for use in the dense phase induction system 12 and a dense phase distribution system 22.

As will be described below in greater detail, the dense phase induction system 12 inducts the granular material 18 into the dense phase distribution system 22 where it is ultimately distributed by a seeder, planter, and the like. In the example embodiment, the granular material 18 flows downstream from the dense phase induction system 12 through a pair of delivery lines 24. Each delivery line is configured in a single shoot arrangement to supply one half of the dense phase distribution system 22 with the granular material 18. For clarity, only one half of a typical air seeded (i.e., exemplary dense phase distribution system 22) is shown in FIG. 1 and described herein with the understanding that the remaining half is substantially similar to that described.

With continued reference to FIG. 1, the delivery line 24 includes a pair of branches 26 that route the granular material 18 to one of multiple valves 28. The valves 28 are in fluid communication with respective secondary containment tanks 30 that temporarily store the granular material 18 before it passes out of the secondary containment tank 30 as determined by a metering device 32. Each secondary containment tank 30 includes a vent 54 to prevent excessive backpressure in the delivery lines 24, thereby improving efficiency. A sensor 40 determines the amount of granular material 18 in each secondary containment tank 30. A controller 43 (generally shown in FIG. 1 coupled to the wheeled frame 14, but capable of being housed or coupled in any number of locations) receives information from the sensor 40 and controls the supply of valve actuation air (typically supplied by the compressor 20 via actuation line 42) and the state of solenoids 44 that actuate the valves 28. The controller 43 can actuate the solenoids 44, thereby opening preferably one or more of the valves 28 to fill the respective secondary containment tank 30 with granular material 18. The metering device 32 ensures the desired dilute phase flow of the granular material 18 via the seeder heads 34. A blower 36 provides the dilute phase air through a series of blower lines 38 to motivate the metered granular material 18 out the seeder heads 34. While only one is shown for clarity, a delivery line 35 is secured to a seeding frame 37 by a bracket 39 supporting a spring-loaded arcuate rod 41, as is known to one of ordinary skill in the art.

One skilled in the art will appreciate the variety of dense phase distribution systems 22 (e.g., seeders, planters, and the like) configurable for use with the present invention. The components, arrangement, and configuration of the overall agricultural implement 10 can be altered yet remain within the scope of the present invention.

With continued reference to FIG. 1, the dense phase induction system 12 of the exemplary embodiment incorporates a transfer auger 46 housed in an auger chute 48. Actuating the auger motor 50 drives the auger 46 to auger granular material 18 from within the granular supply tank 16, up the auger chute 48, and into the dense phase induction system 12. The configuration shown is preferred due to the space limitations presented in the agricultural context; however, one skilled in the art will appreciate that the dense phase induction system 12 may be fed by a variety of other techniques, including a gravity-fed configuration. As previously noted, the dense phase induction system 12 receives a pneumatic pressure from the compressor 20 via induction pressure line 52. One skilled in the art will appreciate that a single or multiple compressors 20 of many differing constructions (reciprocating, rotary screw, centrifugal, etc.) can be incorporated.

The construction and operation of the dense phase induction system 12 are best shown in FIGS. 2-5. The dense phase induction system 12 is oriented relative to a horizontal plane 56 that is defined as being oriented substantially normal to a force of gravity acting on the granular material 18. In the example embodiment, the dense phase induction system 12 is generally cylindrical to provide a symmetric geometry for the flow of the granular material 18. However, the dense phase induction system 12 may have a variety of form factors depending upon the application requirements.

The granular material 18 is fed downstream into an induction chamber 58 through an induction chamber inlet 60. An induction valve assembly 62 is positioned between the induction chamber 58 and an intermediate chamber 64 positioned downstream to control the flow of granular material 18 between the induction chamber 58 and the intermediate chamber 64. The induction valve assembly 62 includes a preferably arcuate valve seat 66 that is secured between the induction chamber 58 and the intermediate chamber 64. The arcuate valve seat 66 extends generally radially inward and downstream from an induction chamber interior surface 68. Specifically, the arcuate valve seat 66 generally tapers radially inward from a valve seat upstream end 70 toward a valve seat downstream end 72 along a valve seat surface 74. The valve seat surface 74 defines a valve seat angle 76 relative to the horizontal plane 56. The orientation of the valve seat surface 74 is discussed in greater detail in combination with the general operation of the dense phase induction system 12. The arcuate valve seat 66 is preferably comprised of ultra high molecular weight plastic for its rigidity, light weight, ease of machining, good resistance to wear, and beneficial surface qualities (e.g., reduced surface friction compared to other similar materials). However, other plastics and metals (e.g., nylon, aluminum, and the like) may form all or a portion of the arcuate valve seat 66.

The induction valve assembly 62 also includes a preferably arcuate plunger 78 that extends generally radially inward and upstream. Specifically, the arcuate plunger 78 generally tapers radially inward from a plunger downstream end 80 toward a plunger upstream end 82 along a plunger surface 84. Similar to the arcuate valve seat 66, the arcuate plunger 78 is preferably comprised of ultra high molecular weight plastic, but other plastics and metals (e.g., nylon, aluminum, and the like) may form all or a portion of the arcuate plunger 78.

In the preferred example embodiment, the plunger surface 84 defines both a plunger upstream angle 86 relative to the horizontal plane 56 and a plunger downstream angle 87, also relative to the horizontal plane 56. As with the valve seat surface 74, the orientation of the plunger surface 84 is discussed in greater detail in combination with the general operation of the dense phase system 12.

The arcuate plunger 78 is selectively moveable between a sealing position (shown in FIGS. 2 and 4) in which the arcuate plunger 78 is in sealing contact with the arcuate valve seat 66, thereby preventing the granular material 18 from flowing between the induction chamber 58 and the intermediate chamber 64, and a transfer position (shown in FIG. 3) in which the arcuate plunger 78 is spaced apart from the arcuate valve seat 66 to allow the granular material 18 to flow into the intermediate chamber 64 through an induction chamber outlet 88 (shown best in FIG. 3) downstream of the induction chamber inlet 60.

An actuator assembly 90 is incorporated to move the arcuate plunger 78 between the sealing position and the transfer position. The actuator assembly 90 includes an actuator 92 operatively coupled to the controller 43 to logically control the movement of the arcuate plunger 78. In the example embodiment, the actuator 92 is supported in a holder 94 having a series of support brackets 96 extending from the holder 94 and into the arcuate valve seat 66. Alternatively, the support brackets 96 may extend to the induction chamber interior surface 68. An actuator rod 98 is secured to a mating recess 100 formed in the arcuate plunger 78 to couple the arcuate plunger 78 to the actuator 92. One skilled in the art will appreciate the varied techniques available to construct and secure the actuator assembly 90.

In operation, the controller 43 actuates the auger 46 to auger granular material 18 from the granular supply tank 16, up the auger chute 48, and into the induction chamber 58. The induction chamber 58 is substantially at atmospheric pressure, similar to that of the granular supply tank 16, to minimize any pressure build up or resistance within the induction chamber 58. The controller 43 monitors an induction bin level sensor 102 as the granular material 18 fills the induction chamber 58 and de-energizes the auger motor 50 when the desired level of granular material 18 is contained within the induction chamber 58. When the controller 43 determines that the induction chamber 58 contains the requisite amount of granular material 18, an intermediate port 104 of the intermediate chamber 64 is configured to be in fluid communication with the ambient environment via exhaust valve 106. By opening the exhaust valve 106, the intermediate chamber 64 is operating at substantially the same pressure as the induction chamber 58 (i.e., ambient pressure) to allow the granular material 18 within the induction chamber 58 to flow relatively unrestricted into the intermediate chamber 64.

Figure 3:
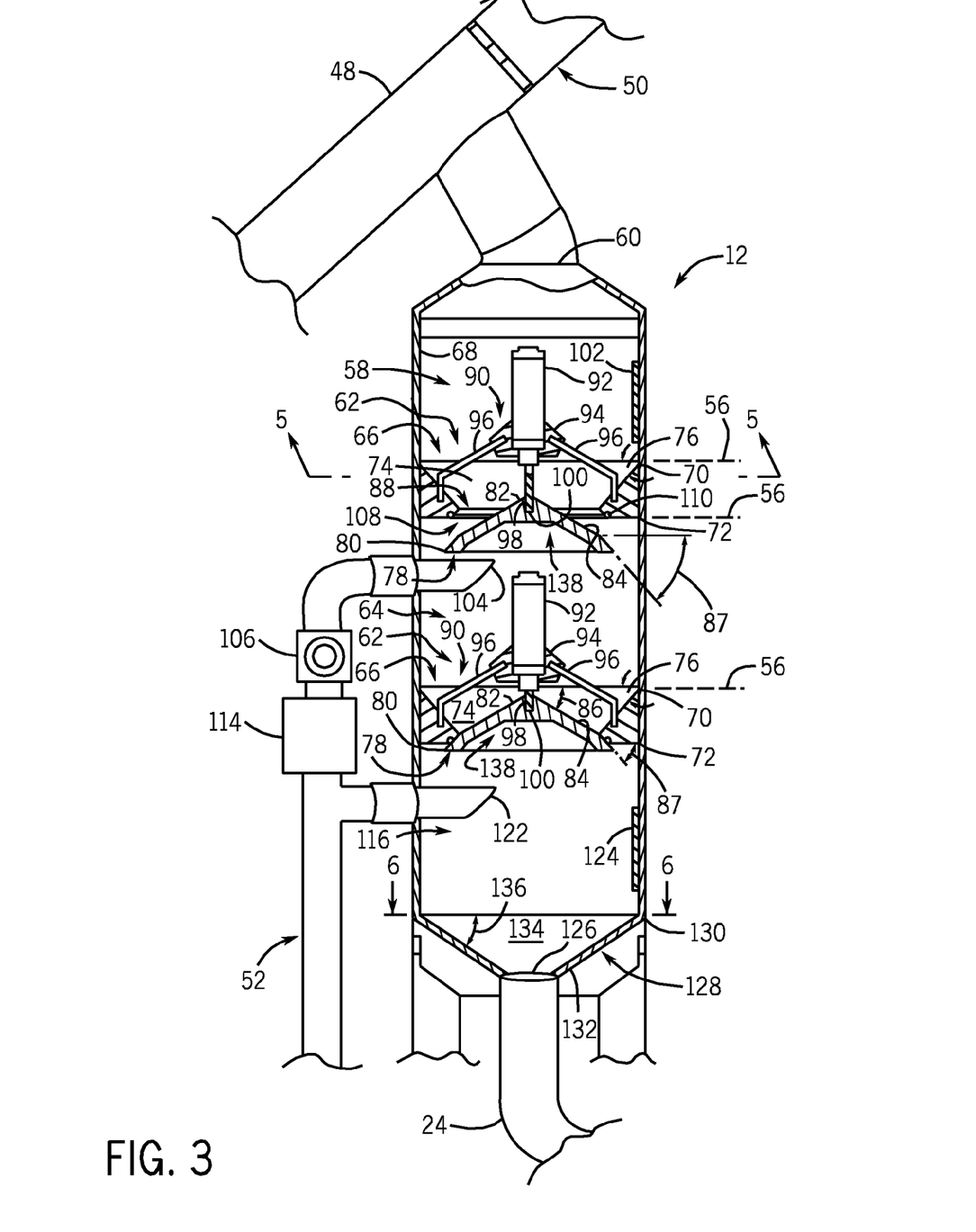
FIG. 3 is a partial sectioned perspective view of the dense phase induction system of FIG. 2 showing the induction valve assembly in an alternative configuration.
Figure 4:
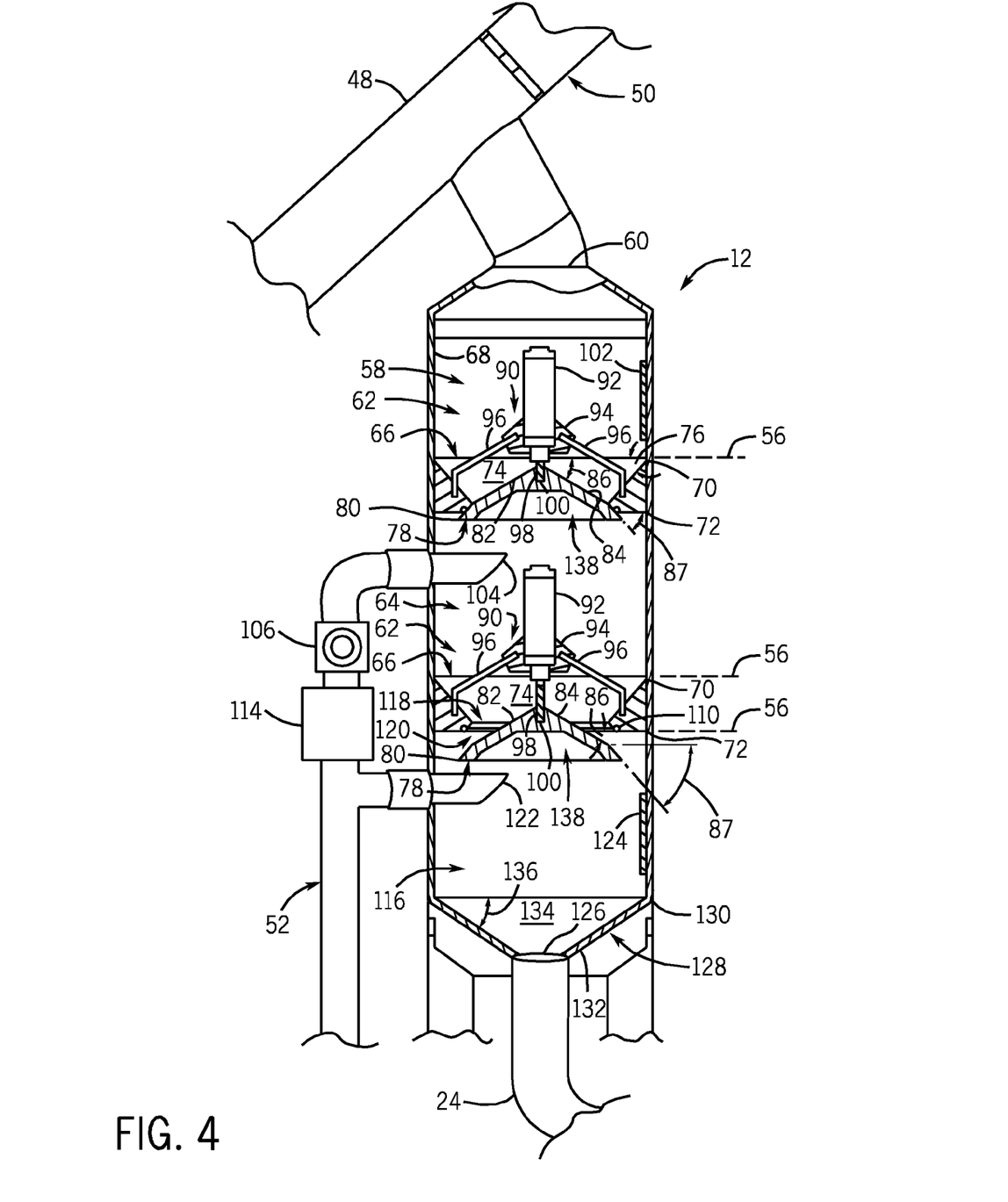
FIG. 4 is a partial sectioned perspective view of the dense phase induction system of FIG. 2 showing the induction valve assembly in another alternative configuration.
Figure 5:
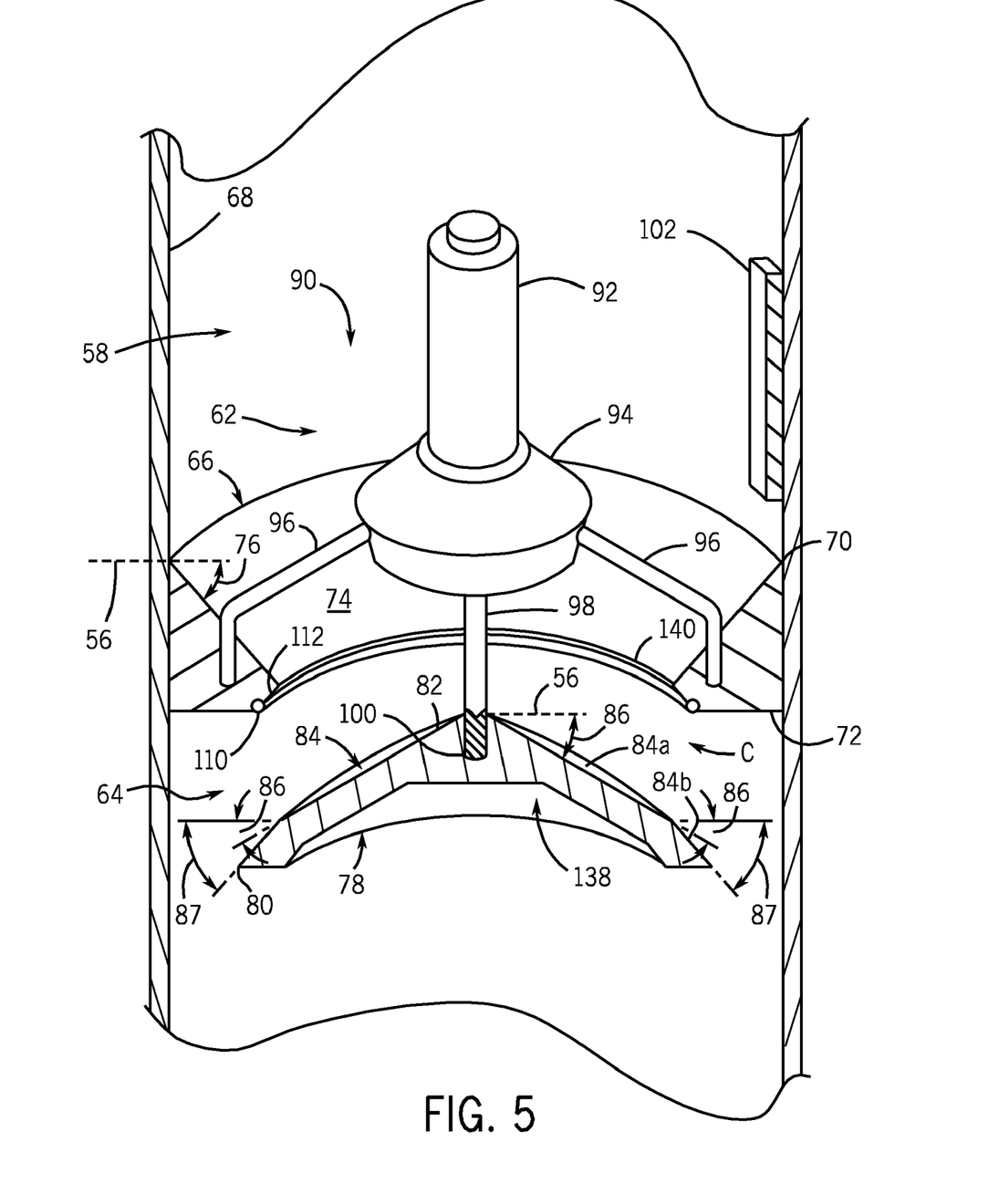
FIG. 5 is a partial section view of the exemplary induction valve assembly along line 5-5 of FIG. 3.

With additional reference to FIGS. 3 and 5, the controller 43 energizes the actuator 92 causing the arcuate plunger 78 to move from the sealing position to the transfer position. The actuator 92 is preferably pneumatic (having an electromagnetic solenoid for controlling the pneumatics) and includes an internal spring (not shown) to bias the arcuate plunger 78 toward the sealing position (shown in FIG. 1). One skilled in the art will appreciate the variety of mechanisms and configurations available to move the arcuate plunger 78 relative to the arcuate valve seat 66.

As the arcuate plunger 78 is moved toward the transfer position, the granular material 18 within the induction chamber 58 is motivated by gravity toward the intermediate chamber 64. The orientation and configuration of the valve seat surface 74 and plunger surface 84 aid the flow of granular material 18. In the example embodiment, at least one of the plunger upstream angle 86 relative to the horizontal plane 56, the plunger downstream angle 87 relative to the horizontal plane 56, and the valve seat angle 76 relative to the horizontal plane 56 are substantially equal to or greater than an angle of repose of the particular granular material 18 being transferred through the dense phase induction system 12.

In the preferred example embodiment, the arcuate plunger 78 is configured such that the plunger surface 84 includes an upstream plunger surface 84a and a downstream plunger surface 84b, best shown in FIG. 5. The plunger upstream angle 86 is defined in relation to the upstream plunger surface 84a and the plunger downstream angle 87 is defined in relation to the downstream plunger surface 84b. The plunger downstream angle 87 is preferably greater than the plunger upstream angle 86 to establish a low-profile arcuate plunger 78 (as a result of the shallower plunger upstream angle 86), to establish an increased discharge rate of granular material 18 as a result of the steeper plunger downstream angle 87, and to help prevent granular material 18 from being crushed proximate an engagement surface 112 (discussed below). This configuration also minimizes the required stroke or throw of the arcuate plunger 78 to establish the desired discharge clearance C (shown in FIG. 5) to allow the granular material 18 to move downstream.

The angle of repose is dictated by the material properties of the particular granular material 18. Specifically, the shape and friction between grains of the granular material 18 influence the angle of repose. The angle of repose can be approximated by piling the granular material 18 on a level surface such that a conical body having a peak and a base is formed thereon. The angle of repose can be either measured as the angle between the level surface and the sloping surface of the granular material or as the angle between a horizontal surface and the same sloping surface. The angle of repose substantially defines the minimum angle at which the particular granular material 18 will flow urged only by the force of gravity acting on the grains within the granular material 18.

As one exemplary embodiment of the invention, the granular material 18 may include seed having an angle of repose that is approximately thirty degrees. The plunger upstream angle 86 and/or the valve seat angle 76 are preferably substantially between thirty-two degrees and thirty-five degrees relative to the horizontal plane 56. The plunger downstream angle is preferably substantially forty-five degrees relative to the horizontal plane 56. In certain preferred circumstances, the plunger upstream angle 86 is substantially thirty-two degrees and the plunger downstream angle 87 is substantially forty-five degrees.

As another exemplary embodiment of the invention, the granular material 18 may include fertilizer having an angle of repose that is approximately thirty-eight degrees. In this situation, the plunger upstream angle 86 and/or the valve seat angle 76 are preferably substantially between forty degrees and forty-three degrees relative to the horizontal plane 56. In certain preferred circumstances, the plunger downstream angle 87 is substantially between forty-five degrees and forty-seven degrees. In each scenario, the valve seat surface 74 and/or the plunger surface 84 are oriented to ensure that the granular material 18 is urged downstream from the induction chamber 58 to the intermediate chamber 64 when the arcuate plunger 78 is in the transfer position. This configuration and orientation reduces the flow resistance in the overall dense phase induction system 12 and establishes an efficient flow path for the granular material 18.

After all of the granular material 18 has flowed out of the induction chamber outlet 88 and into the intermediate chamber 64 via an intermediate chamber inlet 108, the actuator 92 is deactivated and the internal spring moves the arcuate plunger 78 back to the sealing position shown in FIG. 1. As the arcuate plunger 78 engages the arcuate valve seat 66, the plunger surface 84 engages a flexible member 110 (e.g., an O-ring) coupled to the engagement surface 112 of the arcuate valve seat 66. The engagement surface 112 is generally oriented downstream so as to engage the plunger surface 84. Preferably, the downstream plunger surface 84b is configured and oriented to mate with and engage the engagement surface 112 and flexible member 110 when the arcuate plunger 78 is in the sealing position.

Figure 2:
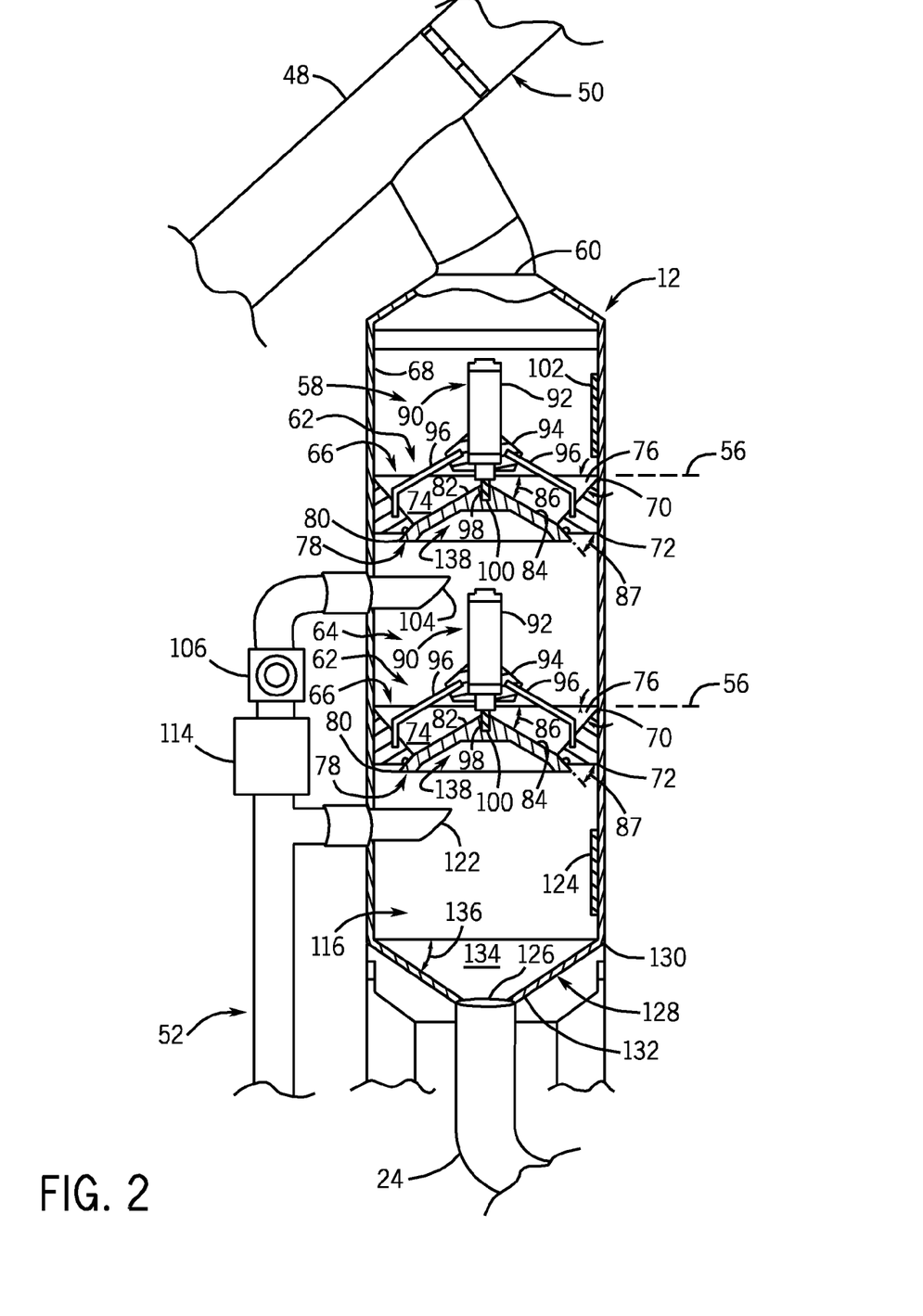
FIG. 2 is a partial sectioned perspective view of a dense phase induction system showing an induction valve assembly in accordance with an aspect of the invention.

With the induction valve assembly 62 oriented as shown in FIG. 2, the controller 43 closes the exhaust valve 106 and opens pressure valve 114 directing pneumatic pressure from the compressor 20 via the induction pressure line 52 into the intermediate chamber 64 through the intermediate port 104. The intermediate chamber 64 is pressurized until the intermediate chamber 64 and a distribution chamber 116 positioned downstream are at substantially the same pressure (e.g., the pressure required to motivate the granular material 18 through the delivery lines 24). This again reduces the resistance as the granular material 18 within the intermediate chamber 64 flows from an intermediate chamber outlet 118 (shown best in FIG. 4) to a distribution chamber inlet 120.

Another, albeit substantially identical, induction valve assembly 62 is positioned between the intermediate chamber 64 and the distribution chamber 116 and is moveable by a similar actuator assembly 90. The arcuate plunger 78 is moveable between a sealing position at which the arcuate plunger 78 is in sealing contact with the arcuate valve seat 66 (shown in FIGS. 2 and 3) and a transfer position at which the arcuate plunger 78 is spaced apart from the arcuate valve seat 66 (shown in FIG. 4). As with the induction valve assembly 62 positioned between the induction chamber 58 and the intermediate chamber 64, the induction valve assembly 62 positioned between the intermediate chamber 64 and the distribution chamber 116 preferably incorporates the sealing function and the transfer function (i.e., the valve seat angle 76 and/or plunger upstream angle 86/plunger downstream angle 87 are substantially equal to or greater than the angle of repose of the granular material 18).

To ensure substantially equal pressures in the intermediate chamber 64 and the distribution chamber 116, the distribution chamber includes a distribution port 122 coupled to the induction pressure line 52. When the pressures are at the requisite levels, the arcuate plunger 78 is moved from the sealing position to the transfer position (shown in FIG. 4) thereby allowing the granular material to travel along the valve seat surface 74 and the plunger surface 84 through the intermediate chamber outlet 118 and into the distribution chamber 116 via the distribution chamber inlet 120. A distribution bin level sensor 124 is monitored by the controller 43 to determine the rate at which granular material 18 must be fed into the dense phase induction system 12 in order to maintain a constant supply of granular material 18 at the requisite dense phase distribution pressure (e.g., 1 bar or 14.5 psig).

Figure 6:
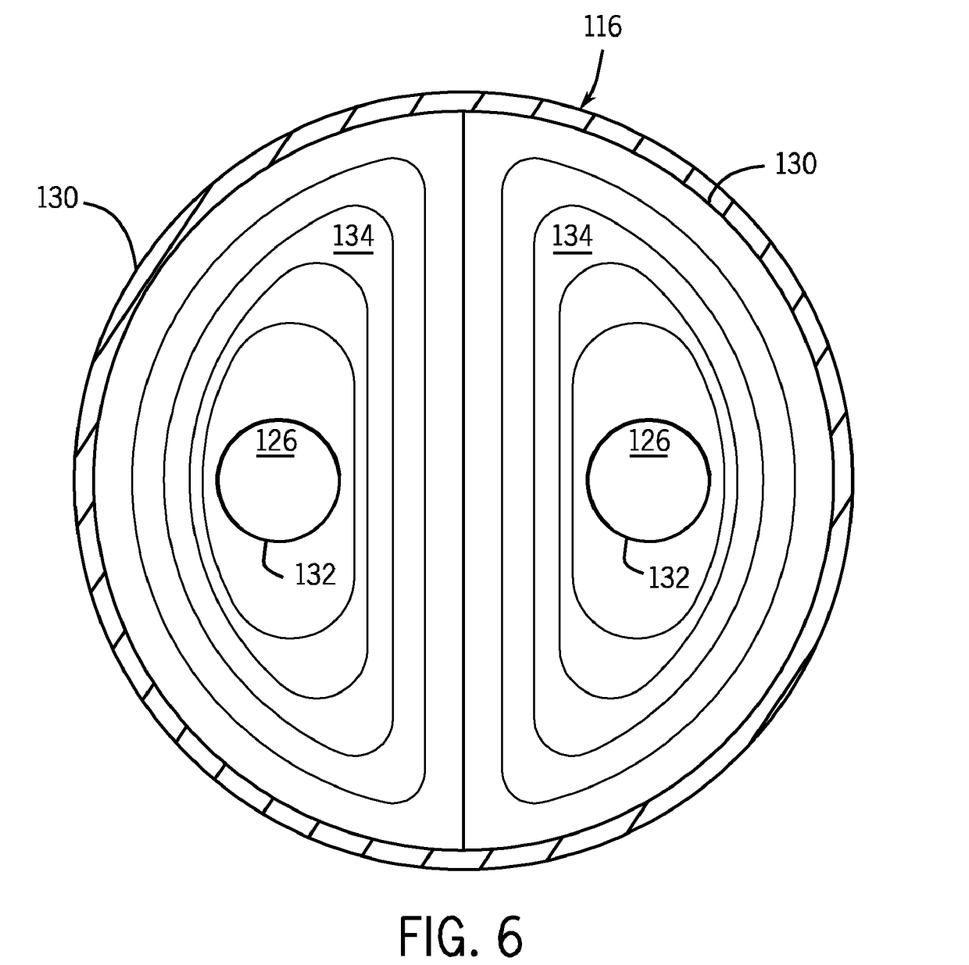
FIG. 6 is a partial section view of a portion of the dense phase induction system along line 6-6 of FIG. 3.

The distribution chamber 116 of the example embodiment includes a pair of distribution chamber outlets 126 that are in fluid communication with the dense phase distribution system 22 via respective delivery lines 24. With reference to FIGS. 3 and 6, the distribution chamber 116 has an arcuate bottom surface 128 that tapers radially inward from an upstream bottom end 130 toward a downstream bottom end 132 along a bottom surface 134. The bottom surface 134 generally defines a pair of bottom surface angles 136 relative to the horizontal plane 56 that are preferably equal to or greater than the angle of repose defined by the granular material 18. The bottom surface 134 may be generally conical and is configured to reduce the resistance inherent in the dense phase induction system 12.

With the configuration as described above having a dense phase induction system 12 that is approximately three feet in height and ten inches in diameter, the granular material 18 may be inducted by the dense phase induction system 12 (i.e., travel from the induction chamber 58 to the distribution chamber 116) in approximately five seconds. The desired throughput of the dense phase induction system 12 is upwards of two hundred pounds per minute. The specific application requirements dictate the actual throughput requirements of the dense phase induction system 12.

As noted above, the form factor and geometry of the induction chamber 58, the intermediate chamber 64, and the distribution chamber 116 is preferably generally cylindrical. The cylindrical shape aids uniform flow and transfer of the granular material 18 through and between the induction chamber 58, the intermediate chamber 64, and the distribution chamber 116. Many alternative configurations and constructions are available and within the scope of the present invention.

Similarly, the form factor and geometry of the arcuate valve seat 66 and the arcuate plunger 78 may also have a variety of configurations. In the preferred example embodiment, both the arcuate valve seat 66 and the arcuate plunger 78 are substantially conical. This symmetric conical geometry aids uniform flow and transfer of the granular material 18 as it flows between the induction chamber 58, the intermediate chamber 64, and the distribution chamber 116. The contours of the arcuate valve seat 66 and the arcuate plunger 78 may be any alternative curved geometry that does not substantially impede the flow of granular material.

As best shown in FIGS. 2-5, the configuration of the induction valve assembly 62 provides a secure seal between the arcuate valve seat 66 and the arcuate plunger 78. For example, the arcuate plunger 78 defines a cavity 138 that may be filled with pressurized air during operation. The pressurized air acts on the arcuate plunger 78 to urge it toward the arcuate valve seat 66. With specific reference to FIG. 5, the plunger surface 84 is urged into sealing engagement with the flexible member 110 coupled to the engagement surface 112 that is angled partially downstream. As noted above, the engagement surface 112 is preferably proximate the valve seat downstream end 72. In the example embodiment, the flexible member 110 is an O-ring and the engagement surface 112 is formed on the downstream side of a rim 140 (shown only in FIG. 5) proximate the valve seat downstream end 72. Again, one skilled in the art will appreciate the alternative geometries and configurations in accordance with the invention.

Several example embodiments of the invention have been described in considerable detail. Many modifications and variations to the example embodiments described will be apparent to a person of ordinary skill in the art. Therefore, the invention should not be limited to the preferred example embodiments described.

I claim:

1. A dense phase induction system for inducting a granular material from a granular supply to a dense phase distribution system relative to a horizontal plane oriented substantially normal to a force of gravity, comprising:
    an induction chamber downstream of the granular supply having:
        an induction chamber inlet in selective fluid communication with the granular supply; and
        an induction chamber outlet downstream of the induction chamber inlet;
    an intermediate chamber downstream of the induction chamber having:
        an intermediate chamber inlet in selective fluid communication with the induction chamber outlet; and
        an intermediate chamber outlet downstream of the intermediate chamber inlet;
    a distribution chamber downstream of the intermediate chamber having:
        a distribution chamber inlet in selective fluid communication with the intermediate chamber outlet; and
        a distribution chamber outlet downstream of the distribution chamber inlet and in selective fluid communication with the dense phase distribution system;
    a first induction valve assembly positioned between the induction chamber and the intermediate chamber, the first induction valve assembly including:
        an arcuate first valve seat that tapers radially inward from a first valve seat upstream end toward a first valve seat downstream end along a first valve seat surface; and
        an arcuate first plunger that tapers radially inward from a first plunger downstream end toward a first plunger upstream end along a first plunger surface;
        wherein the arcuate first plunger is moveable between a first sealing position at which the arcuate first plunger is in sealing contact with the arcuate first valve seat and a first transfer position at which the arcuate first plunger is spaced apart from the arcuate first valve seat; and
    a second induction valve assembly positioned between intermediate chamber and the distribution chamber, the second induction valve assembly including:
        an arcuate second valve seat that tapers radially inward from a second valve seat upstream end toward a second valve seat downstream end along a second valve seat surface; and
        an arcuate second plunger that tapers radially inward from a second plunger downstream end toward a second plunger upstream end along a second plunger surface;
        wherein the arcuate second plunger is moveable between a second sealing position at which the arcuate second plunger is in sealing contact with the arcuate second valve seat and a second transfer position at which the arcuate second plunger is spaced apart from the arcuate second valve seat.

2. The dense phase induction system of claim 1, further comprising:
    a first valve seat angle defined between the first valve seat surface and the horizontal plane;
    a first plunger upstream angle defined between the first plunger surface and the horizontal plane;
    a second valve seat angle defined between the second valve seat surface and the horizontal plane; and
    a second plunger upstream angle defined between the second plunger surface and the horizontal plane;
    wherein at least one of the first valve seat angle, the first plunger upstream angle, the second valve seat angle, and the second plunger upstream angle are substantially equal to or greater than an angle of repose defined by the granular material.

3. The dense phase induction system of claim 2, further comprising:
    a first plunger downstream angle defined between the first plunger surface and the horizontal plane; and
    a second plunger downstream angle defined between the second plunger surface and the horizontal plane;
    wherein at least one of the first plunger downstream angle and the second plunger downstream angle are substantially equal to or greater than the angle of repose defined by the granular material.

4. The dense phase induction system of claim 1, wherein at least one of the arcuate first valve seat, the arcuate first plunger, the arcuate second valve seat, and the arcuate second plunger are substantially conical.

5. The dense phase induction system of claim 1, wherein the distribution chamber further comprises:
    an arcuate bottom that tapers radially inward from an upstream bottom end toward a downstream bottom end along a bottom surface; and a bottom surface angle defined between the bottom surface and the horizontal plane;

wherein the bottom surface angle is substantially equal to or greater than an angle of repose defined by the granular material.

6. The dense phase induction system of claim 1, further comprising:

a first actuator assembly operatively coupled to the arcuate first plunger to move the arcuate first plunger between the first sealing position and the first transfer position; and a second actuator assembly operatively coupled to the arcuate second plunger to move the arcuate second plunger between the second sealing position and the second transfer position.

7. The dense phase induction system of claim 6, wherein: the first actuator assembly comprises:

a first actuator operatively coupled to the arcuate first plunger; and a first support bracket extending from one of the arcuate first valve seat and the induction chamber to support the first actuator; and the second actuator assembly comprises:

a second actuator operatively coupled to the arcuate second plunger; and a second support bracket extending from one of the arcuate second valve seat and the intermediate chamber to support the second actuator.

8. The dense phase induction system of claim 7, wherein at least one of the first actuator and the second actuator are configured to bias the at least one of the arcuate first plunger and the arcuate second plunger respectively toward the first sealing position and the second sealing position.

9. The dense phase induction system of claim 1, wherein:

the intermediate chamber includes an intermediate port configured to receive a fluid into the intermediate chamber or exhaust the fluid from the intermediate chamber; and the distribution chamber includes a distribution port configured to receive a fluid into the distribution chamber.

* * * * *